(12) United States Patent
Shen et al.

(10) Patent No.: US 7,961,251 B2
(45) Date of Patent: Jun. 14, 2011

(54) METHOD AND APPARATUS FOR CONVERSION OF VIDEO FORMATS TO 120 HZ 4 TO 1 INTERLACED FORMATS

(75) Inventors: Richard Chi-Te Shen, Leonia, NJ (US); Sheau-Bao Ng, Briarcliff Manor, NY (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1940 days.

(21) Appl. No.: 10/185,905

(22) Filed: Jun. 28, 2002

(65) Prior Publication Data

US 2004/0001159 A1   Jan. 1, 2004

(51) Int. Cl.
*H04N 7/01* (2006.01)

(52) U.S. Cl. ........ 348/446; 348/441; 348/443; 348/445; 348/448

(58) Field of Classification Search .................. 348/441, 348/443–448; *H04N 7/01*
See application file for complete search history.

(56) References Cited

U.S. PATENT DOCUMENTS

| | | | |
|---|---|---|---|
| 4,276,565 A * | 6/1981 | Dalton et al. ................. | 348/458 |
| 4,531,152 A | 7/1985 | Lemelson et al. | |
| 4,910,605 A * | 3/1990 | Sasaki et al. .................... | 386/34 |
| 5,034,814 A | 7/1991 | Watson ........................... | 358/141 |
| 5,117,289 A * | 5/1992 | Farley et al. ................... | 348/443 |
| 5,138,449 A | 8/1992 | Kerpchar et al. | |
| 5,329,309 A | 7/1994 | Dorricott et al. | |
| 5,412,800 A | 5/1995 | Bril et al. | |
| 5,530,484 A | 6/1996 | Bhatt et al. | |
| 5,907,364 A | 5/1999 | Furuhata et al. | |
| 6,111,610 A * | 8/2000 | Faroudja ........................ | 348/441 |
| 6,429,899 B1 * | 8/2002 | Nio et al. ....................... | 348/443 |
| 6,441,860 B1 * | 8/2002 | Yamaguchi et al. .......... | 348/555 |
| 6,611,294 B1 | 8/2003 | Hirano et al. | |
| 6,791,623 B1 * | 9/2004 | Masuda et al. ................. | 348/563 |

FOREIGN PATENT DOCUMENTS

| | | |
|---|---|---|
| CN | 1140950 A | 1/1997 |
| EP | 0 524 361 A1 | 1/1993 |
| EP | 0 524 361 B1 | 2/1995 |
| FR | 845331 | 8/1939 |
| GB | 2113942 * | 10/1983 |
| JP | 63-18888 | 1/1988 |
| JP | 07-162810 | 6/1995 |
| JP | 08-331473 | 12/1996 |
| WO | WO 99/67952 | 12/1999 |

OTHER PUBLICATIONS

Epstien et al., "The Digital Transformation of Hollyewood: Format and Resolution Independent Digital Post-Production", IEEE, 1994.*

(Continued)

*Primary Examiner* — Brian Yenke
(74) *Attorney, Agent, or Firm* — DLA Piper LLP (US)

(57) ABSTRACT

A method for converting video data in a first video format to video data in a second interlaced video format comprising: determining a number of frames of the first video format to map into a frame of the second video format, the frame of the second video format having four fields; determining a number of lines from each of the number of frames of the first video format to be mapped into each of the four fields of the frame of the second video format; selecting the determined number of lines from each of the number of frames of the first video format; determining a sequence for mapping the number of selected lines into the fields of the frame of the second video format; and mapping the selected lines from each of the number frames of the first video format into the four fields of the frame of the second video format according to the determined sequence.

21 Claims, 8 Drawing Sheets

OTHER PUBLICATIONS

Tao Feng, et al., "A Video Format Conversion Circuit And Its Implementation," Abstract, Publication date: Apr. 2000.

Guanglie Zhang, et al., "A Digital Video Processing Method With Format Conversion And The Hardware Implementation Thereof," Abstract, Publication date: Jun. 2001.

R. Wilton, "Programmer's Guide to PC and PS/2 Video Systems," 1987, Print-Outs of Two Internet Sites: "Complete Instructions To BLOAD and BSAVE EGA and VGA Screens, pp. 1-6; "How To Print Hercules Graphics Screen 3 To An Epson Printer, pp. 1-4.

JP Office Action, Dated: Dec. 4, 2009, p. 2 (English Translation included).

* cited by examiner

METHOD AND APPARATUS FOR CONVERSION OF VIDEO FORMATS TO 120 HZ 4 TO 1 INTERLACED FORMATS

FIELD OF THE INVENTION

The present invention relates to the field of video display formats and display apparatus; more specifically, it relates to a method and an apparatus for converting various video formats to 120 Hz 4 to 1 interlaced video formats.

BACKGROUND OF THE INVENTION

With the introduction of digital television and high definition video, consumer display products are being introduced to support the additional video formats and at the same time be backwards compatible with legacy video formats. Standards for digital television formats are covered by the Advanced Television Selection Committee (ASTC). The ASTC video standard includes a 1080 line/frame interlaced 60 Hz format (1080I@120 Hz), a 720 line/frame progressive format 60 Hz (720P@60 Hz) and a 1080 line/frame progressive 30 Hz format (1080P@30 Hz). The ASTC video standard also includes other formats such as 525I@60 Hz and 525P@60 Hz. A high line number indicates a high display resolution. The frequency designation is the frame display rate or the number of frames displayed in one second. A high frequency display has less large area "flicker."

Examples of legacy formats include the National Television Selection Committee (NTSC) 525 line interlaced 60 Hz (525I@60 Hz) format and the phase alternating lines (PAL) 625 line interlaced 50 Hz (625I@50 Hz) format. In NTSC and PAL interlaced formats, there are two fields per frame, each field containing half the number of lines per frame, one field containing the odd numbered lines and the other field containing the even numbered lines. While the resolution of NTSC and PAL are low, the display equipment is relatively inexpensive, in part because low frequency equipment is less expensive to build and in part because of the maturity of the video display industry.

In displaying interlaced video, the video display unit raster displays all odd-numbered lines in one vertical sweep of the screen and then raster displays all even-numbered lines in the next sweep. With a persistent display device (i. e. the ability to maintain an image for a short time before fading) and the tendency of the human eye to average or blend subtle differences in light intensity, the human viewer sees a complete display, but the amount of information carried by the display signal and the number of lines that must be displayed per sweep are halved. In interlaced mode, the screen refresh frequency is the same as the frame display frequency. In displaying progressive mode video the video display unit raster displays each line of a frame in sequence. In progressive mode, the screen refresh frequency is the same as the frame display frequency.

Conversion between interlaced and progressive mode, between different numbers of scan lines and between different scan frequencies typically requires complex and expensive video signal conversion equipment.

SUMMARY OF THE INVENTION

A first aspect of the present invention is a method for converting video data in a first video format to video data in a second interlaced video format comprising: determining a number of frames of the first video format to map into a frame of the second video format, the frame of the second video format having four fields; determining a number of lines from each of the number of frames of the first video format to be mapped into each of the four fields of the frame of the second video format; selecting the determined number of lines from each of the number of frames of the first video format; determining a sequence for mapping the number of selected lines into the fields of the frame of the second video format; and mapping the selected lines from each of the number frames of the first video format into the four fields of the frame of the second video format according to the determined sequence.

A second aspect of the present invention is a method for converting video data in a first interlaced video format to video data in a second interlaced video format comprising: selecting a first set of lines comprising alternate lines from a first field of a frame of the first interlaced video format; selecting a second set of lines comprising alternate lines not selected for the first set of lines from the first field of the frame of the first interlaced video format; selecting a third set of lines comprising alternate lines from a second field of a frame the first interlaced video format; selecting a fourth set of lines comprising alternate lines not selected for the third set of lines from the second field of the frame of the first interlaced video format; and mapping each set of lines into a different field of four fields of the second interlaced video format.

A third aspect of the present invention is a method for converting video data in a progressive first video format to video data in an interlaced second video format comprising: wherein a number of frames of the first video format to be mapped into a frame of the new video format is equal to the number of fields in the second video format times the display frequency of the first video format divided by the display frequency of the second video format; wherein a number of lines from each of the number of frames of the first video format to be mapped into fields of the frame of the second video format is the number of lines in the frames of the first video format divided by the number of frames of the first video format to be mapped into the frame of the new video format; selecting a first set of lines comprising alternate fourth lines from one of the number of frames of the first video format; selecting a second set of lines comprising alternate fourth lines not selected for the first set of lines from one of the number of frames of the first video format; selecting a third set of lines comprising alternate fourth lines not selected for the first or second set of lines from one of the number of frames of the first video format; selecting a fourth set of lines comprising alternate fourth lines not selected for the for the first, second or third set of lines from one of the number of frames of the first video format; and mapping each set of lines into a different field of four fields of the second video format.

A fourth aspect of the present invention is An apparatus for converting video signal data in a first video format to video signal data in a second video format comprising: one or more video inputs, each video input adapted to receive video signals in a different video type, the video signals in the first video format and each video input adapted to output a digital video signal; a storage device adapted to receive and store the digital video signals; a scan controller adapted to read a stored digital signal of the stored video signals or receive the digital signal from the one or more inputs and adapted to convert the format of the digital signal from the first video format to the second video format, the second video format comprising four interlaced fields and having a field display frequency of 120 Hz; and one or more video outputs, each video output adapted to receive the digital video signal in the second video format and adapted to output the video signal in the second video format.

BRIEF DESCRIPTION OF DRAWINGS

The features of the invention are set forth in the appended claims. The invention itself, however, will be best understood by reference to the following detailed description of an illus

DETAILED DESCRIPTION OF THE INVENTION

A frame of video is defined as the set of lines that when raster displayed form one the total area of one complete picture. The term raster is somewhat circularly defined as a rectangular pattern of lines; on a video display, the horizontal scan lines from which the term raster scan is derived. A field is defined as a subset of the lines of a frame. Fields are used in interlaced video formats, where the lines of each field are raster displayed in alternating sequence. A progressive video format has no fields. The term original video format means the video format that is converted into the new, 120 Hz 4 to 1 interlaced video format by the present invention. The original video format and may be any of the standard formats mentioned supra, or other video formats of varying frame display frequency and lines per frame. The term video format may be shortened to format.

Figure 1:
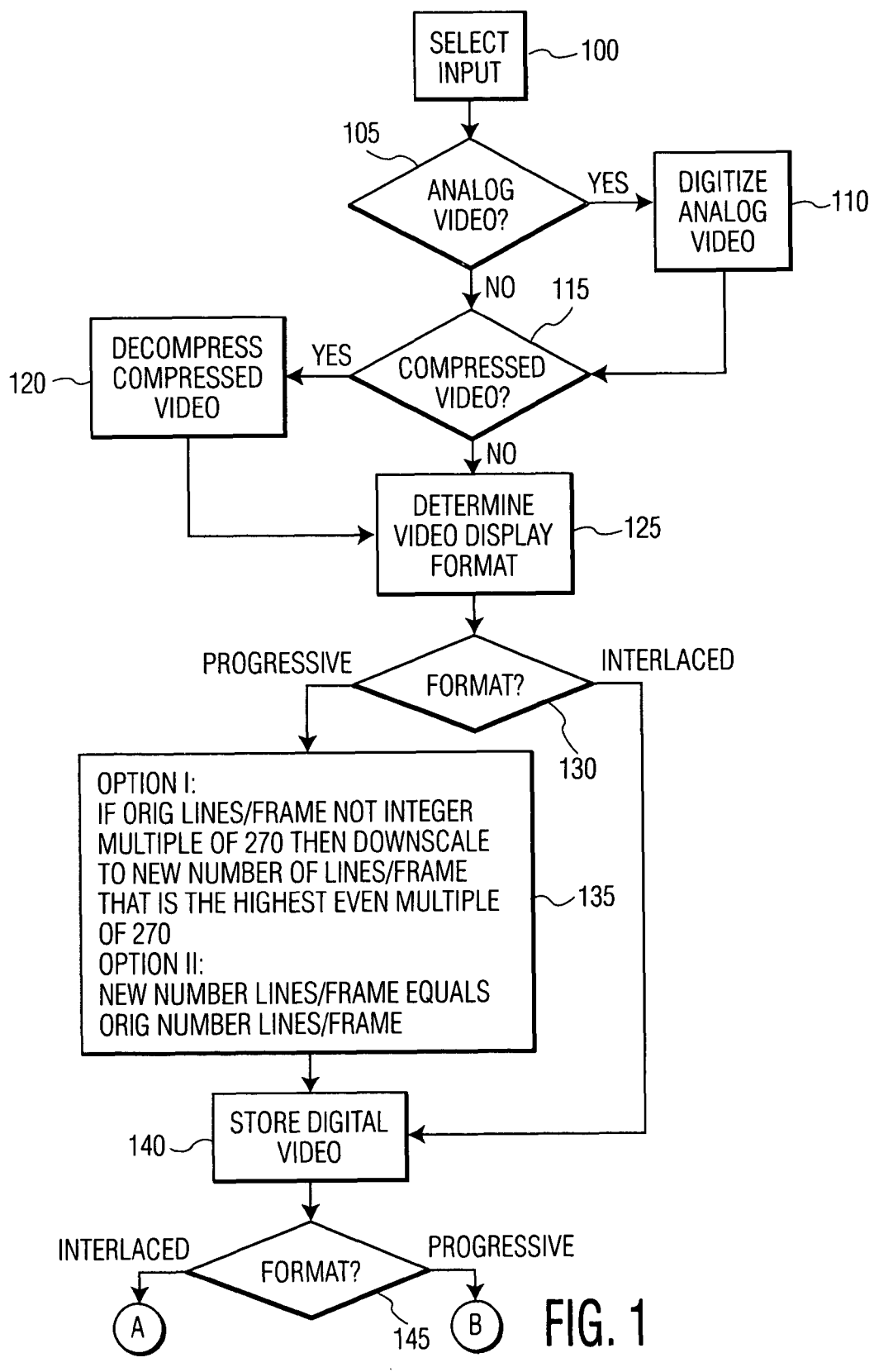
- FIGS. 1 to 3 are flowcharts illustrating the method of converting various video formats to a 120 Hz 4 to 1 interlaced format is according to the present invention.
Figure 2:
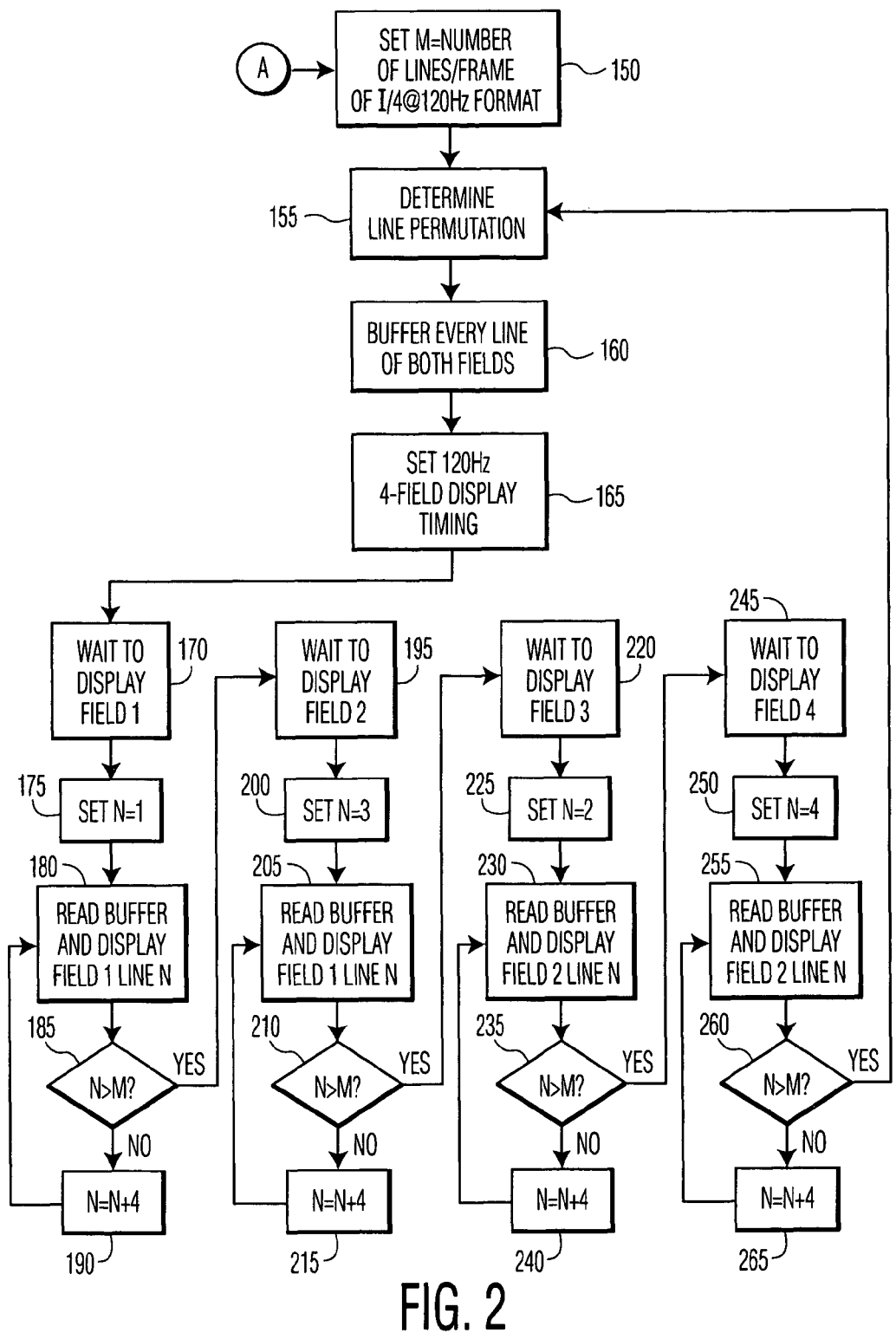
Figure 3:
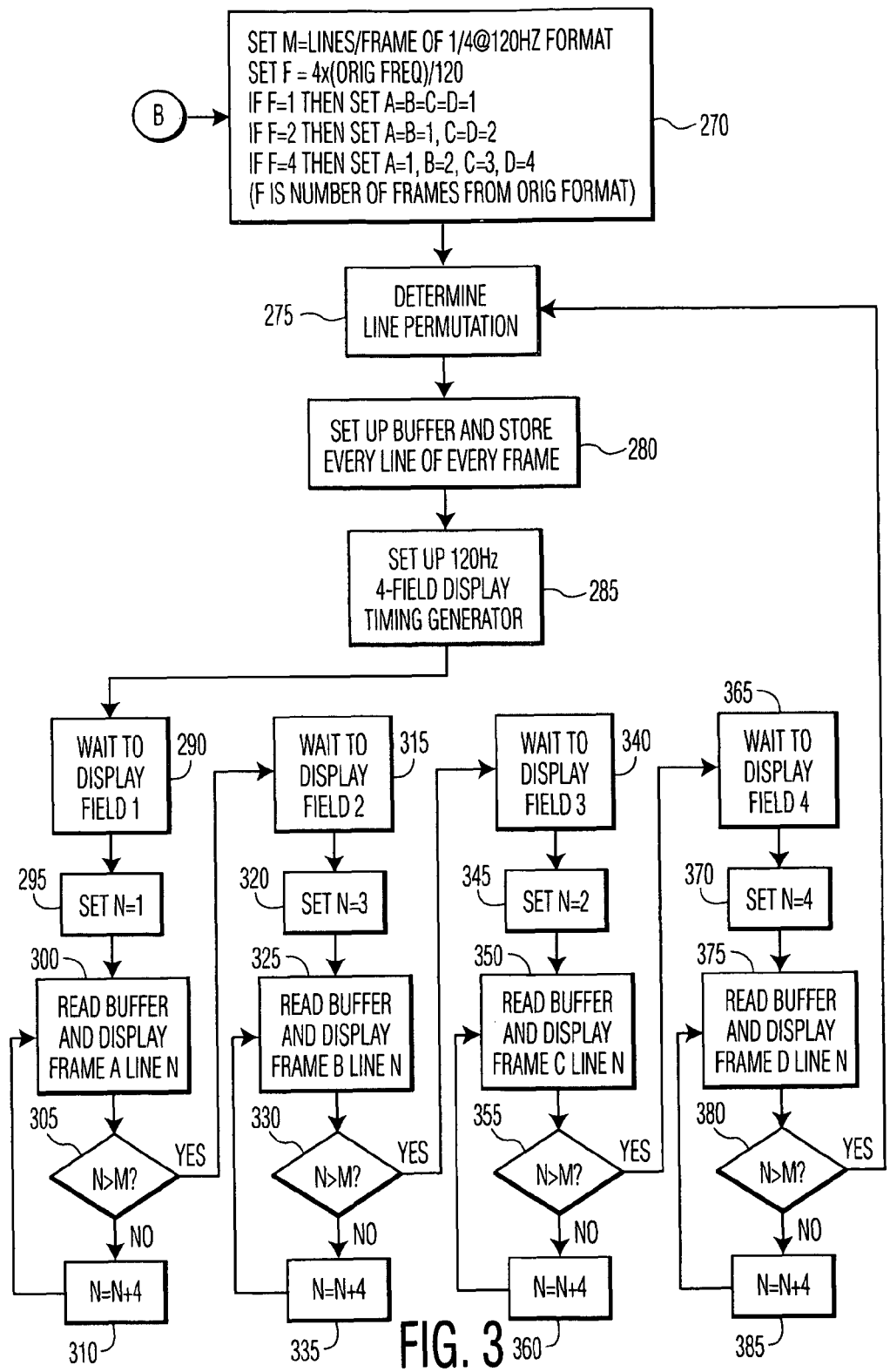

FIGS. 1 to 3 are flowcharts illustrating the method of converting various video formats to the new, 120 Hz 4 to 1 interlaced format according to the present invention. The new, 120 Hz 4 to 1 interlaced format has four fields per frame, each field having one quarter of the lines. Hereafter the new, 120 Hz 4 to 1 interlaced video format will be designated as I/4@120 Hz. I/4 designates 4 interlaced fields. 120 Hz is the field display frequency. A number proceeding the I/4 will indicate the number of lines per frame. Thus, 1080I/4@120 Hz (which is used as an example in FIGS. 1-6) would indicate 1080 lines per frame (270 lines per field). The 1080I/4@120 Hz format is illustrated in FIG. 4.

Figure 4:
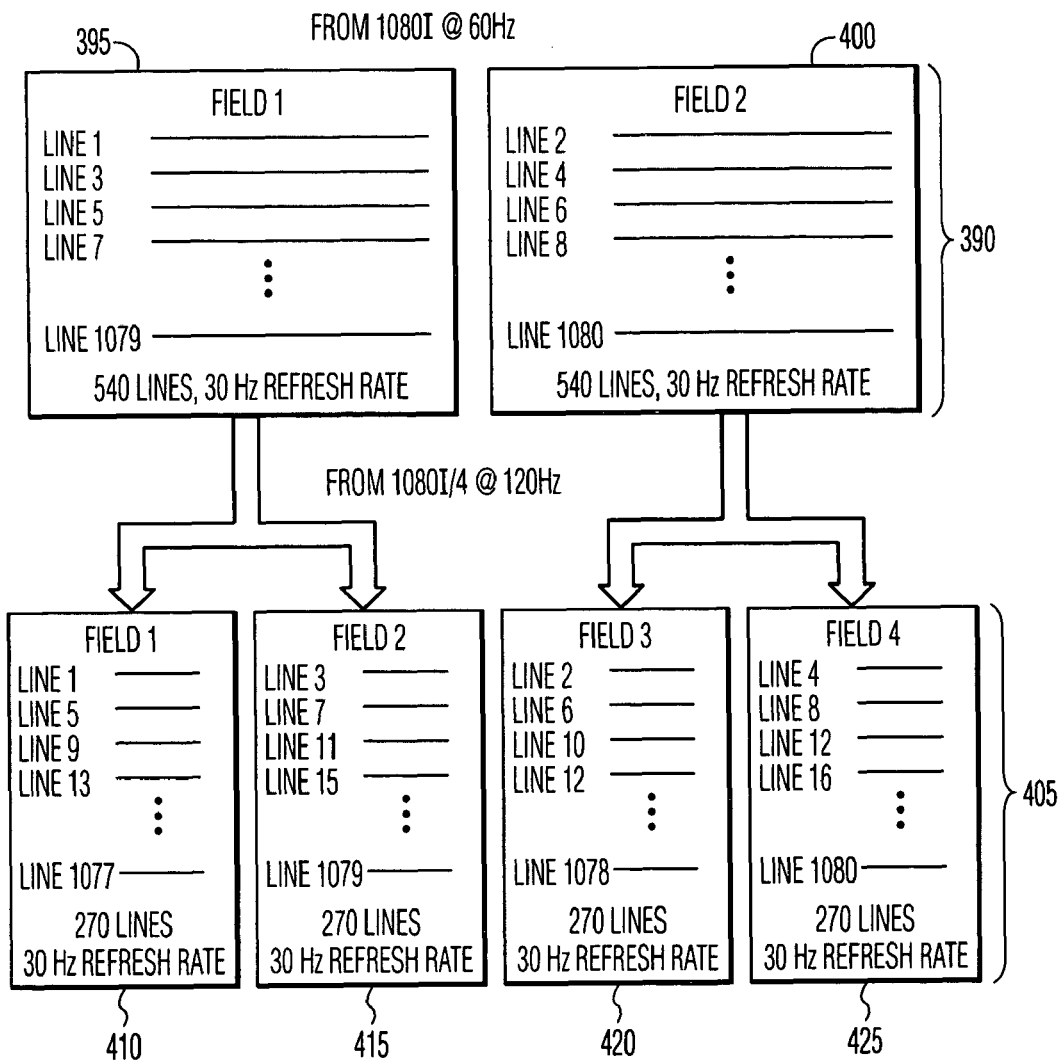
FIG. 4 is a exemplary diagram illustrating mapping of the lines of a first original video format into the lines of a new format according to the present invention.

In the example of FIG. 4, each field has 270 lines (i.e. 1080 lines divided by four fields) each field containing a different set of every fourth line of the frame. The four fields are raster displayed in sequence from field 1 to field 4. The field display frequency of the 1080I/4@120 Hz is 120 Hz. The refresh rate of the 1080I/4@120 Hz format is 30 Hz (i.e. the display frequency divided by the number of fields).

In step 100, the type of video input is selected. A video receiver (see FIGS. 7 and 8) as described infra, may have more than one type of video input. The choices include analog video, digital video and compressed digital video. The invention operates on uncompressed digital video, therefore in step 105 it is determined if the input is analog video. If the input is analog video, then in step 110, the analog video is converted to digital video and the method proceeds to step 115. If in step 105, it is determined that the input is not analog video, then no conversion is necessary and the method proceeds directly to step 115. In step 115, a determination is made if the digital video is compressed digital video. If in step 115, it is determined that the input is compressed, then in step 120, the compressed digital video is decoded and the method proceeds to step 125. If in step 115 it is determined that the digital video is not compressed, then no decoding is required and the method proceeds directly to step 125. In step 125, the format of the digital video is determined (progressive or interlaced and the number of lines per field or frame). In step 130, a decision is made based on whether the digital video format is progressive or interlaced. If the digital video format is progressive, the method proceeds to step 135. If the digital video format is interlaced the method proceeds to step 140.

Step 135 contains two options, only one of which is used at a time. Option I of step 135 forces each of the four fields in the I/4@120 Hz format to contain 270 lines. If the number of lines in a frame of the original video format is not an integer multiple of 270, then the lines per frame of the original video format are downscaled to the highest even multiple of 270 smaller than the original number of lines per frame. For example, if the original video format has 720 lines per frame then the original video is downscaled to 540 lines (2×270) line per frame. The I/4@120 Hz format will contain a frame of 540 lines comprised of 4 fields of 135 lines each. Briefly, the downscale operation involves the use of vertical interpolation filter to resample the input video format to the output video format. If the number of lines per frame of digital video is already an even integer multiple of 270 then the operation of option I has no effect. Option II of step 135 simply sets the number of lines in each frame of the I/4@120 Hz interlaced format to the number of lines in a frame of the original video format. The number of lines per field of the I/4@120 Hz will be the number of lines in a frame of the original video format divided by four. This method would be particularly suited to computer graphics modes as described infra.

In step 140, the digital video is stored on a storage medium and in step 145 another decision is made based that is based on the format of the digital video. If the digital video format is interlaced, the method proceeds to step 150 of FIG. 2. If the digital video format is progressive, the method proceeds to step 270 of FIG. 3.

Turning to FIG. 2 (for processing interlaced video), in step 150, a computational constant (M) is set to the number of lines per frame of the I/4@120 Hz output. This value was calculated in step 135 of FIG. 1. In the example of FIG. 4, M is equal to 1080 (MI/4@120 Hz=1080@120 Hz).

In step 155, a line permutation to be used to reorder the lines from the original interlaced format to the I/4@120 Hz format is determined. One line permutation is illustrated in FIG. 4 and is further discussed in reference to FIG. 4 infra. Because there are 4 fields in the I/4@120 Hz format, there are 24 possible permutations (4 factorial) of the order that sets of lines can be distributed into four fields. A fixed predetermined permutation may be used or the permutation may be dynamically changed from frame to frame based on image characteristics within the video frame. For example, if there is scrolling text, the best of the 24 line set permutations to use for a given frame can be determined from the relative size of the text characters and the speed of the scrolling.

In step 160, the first or next video frame of the original video format is read from memory and every line of the frame is stored in a buffer. In step 165 the I/4@120 Hz field display timing is set or reset for the first or next video frame.

In step 170, raster of new video format field 1 is delayed until the proper time according to the display timing set in step 165. In step 175, a counter N is set to 1. In step 180, line N is read from the buffer and displayed. In step 185, the value of N is checked to see if the last line of field 1 has been read and displayed (i.e. is N>M). If the last line of field 1 has not been read and displayed then step 190, N is incremented by 4 and the method loops back to step 180. If the last line of field 1 has been read and displayed then the method proceeds to step 195.

Steps 195, 200, 205, 210 and 215 are similar to steps 170, 175, 180, 185 and 190 respectively except that in step 200, N is set to 3 and after field 2 display is complete the method proceeds to step 220.

Steps 220, 225, 230, 235 and 240 are similar to steps 170, 175, 180, 185 and 190 respectively except that in step 225, N is set to 2, in step 230 it is the second field of the original video format being read and displayed and after field 3 display is complete the method proceeds to step 245.

Steps 245, 250, 255, 260 and 265 are similar to steps 220, 225, 230, 235 and 240 respectively except that in step 250, N is set to 4 and after field 4 display is complete the method loops back to step 155 to repeat the method for the next video frame.

The sequence of values that N is set to in steps 175, 200, 225 and 250 (note the values do not repeat) create one of the 24 line set permutations possible. The line set permutation illustrated in FIG. 2 and again in FIG. 4 is 1-3-2-4. The actual values quoted are exemplary, any one of the 24 may be used and the permutation used may change for each frame.

Turning to FIG. 3, (for processing progressive video), in step 270, a computational constant (M) is set to the number of lines per frame of the I/4@120 Hz output. This value was calculated in step 135 of FIG. 1. Further, the frequency of the original video format is multiplied by 4 (the number of new video format fields) and divided by 120 (the frequency of the new video format) to determine the number of frames F from the original video format to use in assembling one frame of I/4@120 Hz video format. If the number of frames F is 1 each of computational constants A, B, C and D is set to 1. If the number of frames F is 2, A and B are set to 1 and C and D are set to 2. If the number of frames is 4, A is set to 1, B is set to 2, C is set to 3 and D is set to 4. See infra, FIGS. 5 and 6 and accompanying discussion for examples of F=2 and F=4, respectively.

Figure 5:
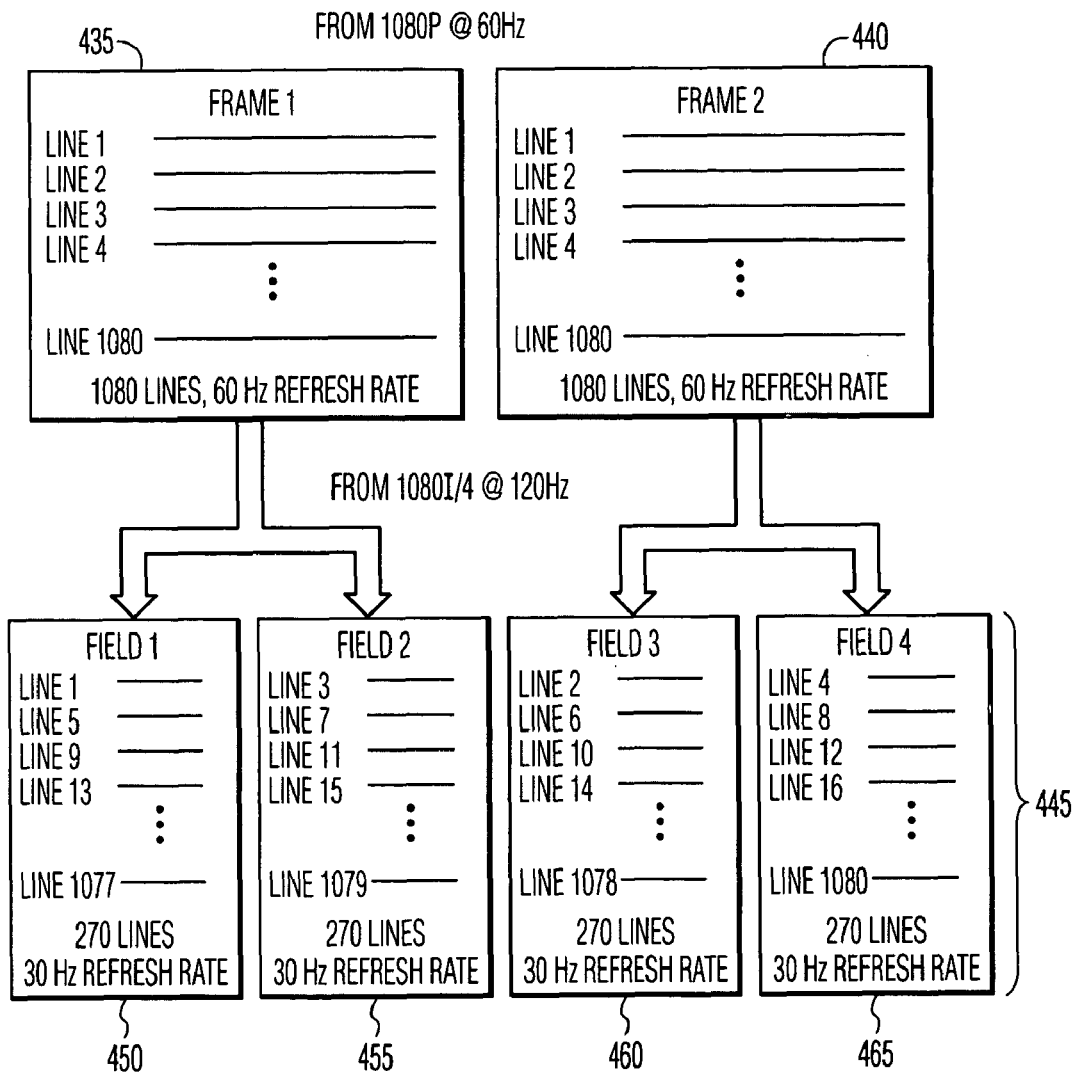
FIG. 5 is a exemplary diagram illustrating mapping of the lines of a second original video format into the lines of a new format according to the present invention.

In step 275, a line permutation to be used to reorder the lines from the original interlaced format to the I/4@120 Hz format is determined. One line permutation is illustrated in FIG. 5 and is further discussed in reference to FIG. 5 infra. Because there are 4 fields in the I/4@120 Hz format, there are 24 possible permutations (4 factorial) of the order that sets of lines can be distributed into four fields. A fixed predetermined permutation may be used or the permutation may be dynamically changed from frame to frame based on image characteristics within the video frame. For example, if there is scrolling text, the best of the 24 line set permutations to use for a given frame can be determined from the relative size of the text characters and the speed of the scrolling.

In step 280, every line of the first (next) F video frames of the original video format is read from memory and stored in a buffer. The number of frames F was calculated in step 270 described supra. In step 285 the I/4@120 Hz field display timing is set or reset for the first or next video frame.

In step 290, raster of field 1 is delayed until the proper time according to the display timing set in step 285. In step 295, a counter N is set to 1. In step 300, a line N from frame A is read from the buffer and displayed. In step 305, the value of N is checked to see if the last line of the field has been read and displayed (i.e. is N=M−(4−N). If the last line of the first new video format field has not been read and displayed in step 305 then in step 310, N is incremented by 4 and the method loops back to step 300. If the last line has been read and displayed in step 305, then the method proceeds to step 315.

Steps 315, 320, 325, 330 and 335 are similar to steps 290, 295, 300, 305 and 310 respectively except that in step 320, N is set to 3 and after field 2 display is complete the method proceeds to step 340.

Steps 340, 345, 350, 355 and 360 are similar to steps 290, 295, 300, 305 and 310 respectively except that in step 345, N is set to 2, and after field 3 display is complete the method proceeds to step 345.

Steps 365, 370, 375, 380 and 385 are similar to steps 290, 295, 300, 305 and 310 respectively except that in step 370, N is set to 4 and after field 4 display is complete the method loops back to step 275 to repeat the method for the next video frame.

Figure 6:
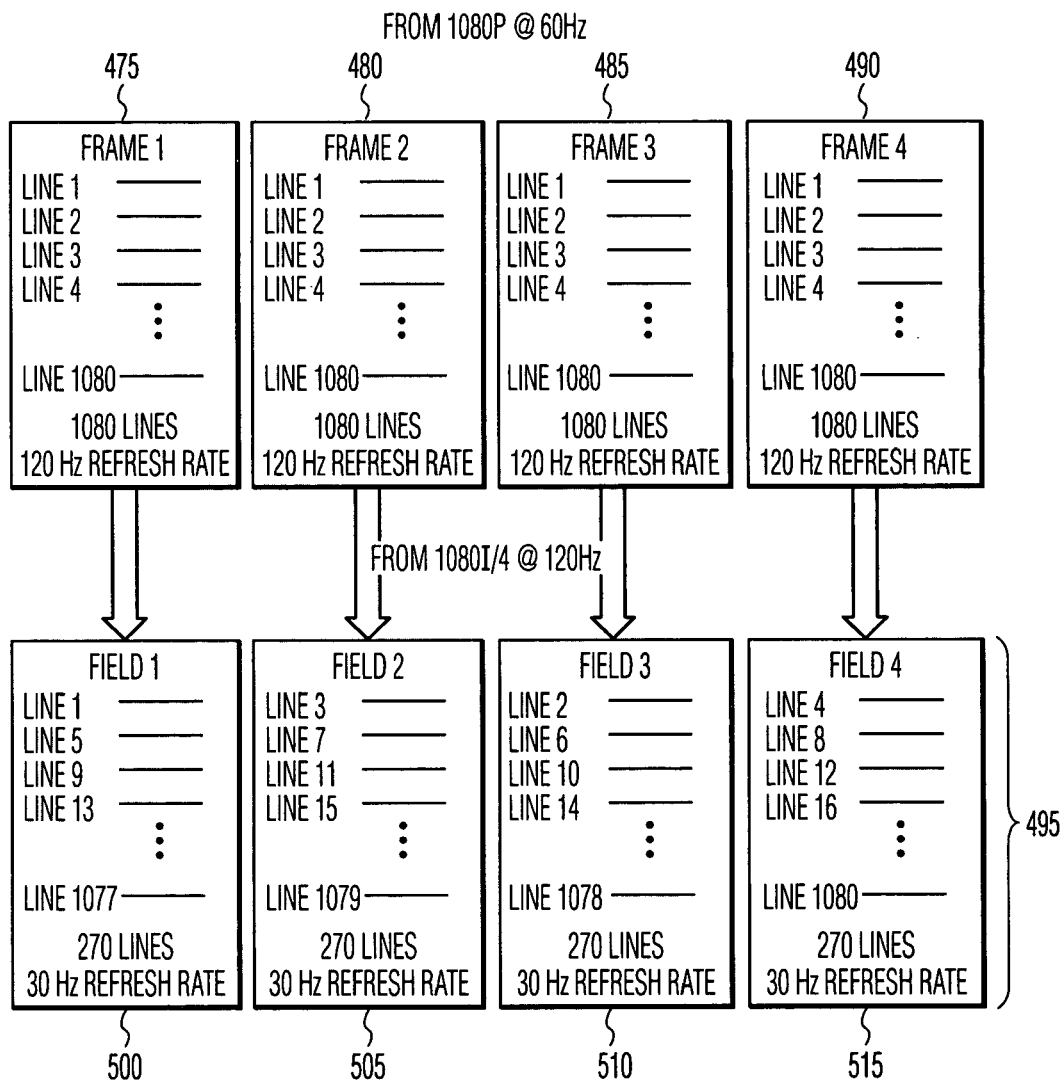
FIG. 6 is a exemplary diagram illustrating mapping of the lines of a third original video format into the lines of a new format according to the present invention.

When F is 2, only every other line from two original video format frames is transferred to one new video format frames and when F is 4, only every fourth line from four original video format frames is transferred to one new video format frame (See FIGS. 5 and 6).

The sequence of values that N is set to in steps 295, 320, 345 and 370 (note the values do not repeat) create one of the 24 line set permutations possible. The line set permutation illustrated in FIG. 3 and again in FIGS. 5 and 6 is 1-3-2-4. The actual values quoted are exemplary, any one of the 24 may be used and the permutation used may change for each frame.

In an alternative to the second embodiment, not every line of every frame of the original video format is stored in the buffer, but only those lines that are to be displayed in the new video format. The selection procedure for the lines to store in the buffer is the same procedure used to select which lines to display described supra in reference to FIG. 3. The buffer would then be read out in sequence with the first quarter of the lines going to the first new field of the new video format, the second quarter of the lines going to the second new field of the new video format, the third quarter of the lines going to the third new field of the new video format and the fourth quarter of the lines going to the fourth new field of the new video format.

FIG. 4 is a exemplary diagram illustrating mapping of the lines of a first original video format into the lines of a new format according to the present invention. FIG. 4 illustrates a conversion from a 1080I@60 Hz video format to a 1080I/4@120 Hz video format according to the present invention, where 1080 is the number of lines per frame, I indicates 2 interlaced fields and I/4 indicates 4 interlaced fields. Original video frame 390 includes a first field 395 including the 540 odd number lines of the original video frame and a second field 400 containing the 540 even number lines of the original video frame. New video frame 405 includes a first field 410 containing a first half of the 540 odd number lines of original video field 395, a second field 415 containing a second half of the 540 odd number lines of original video field 395, a third field 420 containing a first half of the 540 even number lines of original video field 400 and a fourth field 425 containing a second half of the 540 even number lines of original video field 400. The line numbers in first field 395 of original video frame 390 correspond to the same line numbers mapped into first and second fields 410 and 415 of new video frame 405. The line numbers in second field 400 of original frame 390 correspond to the same line numbers mapped into third and fourth fields 420 and 425 of new video frame 405. The mapping of line sets into fields 410, 415, 420 and 425 of new video frame 405 represents only one permutation of line sets of a possible 24. For example, mapping the current line set of field 410 (1,5,9,13 ... 1077) into field 415 and the mapping current lines of field 415 (3,7,11,15 ... 1079) into field 410 with fields 420 and 425 unchanged would be a second of the 24 possible permutations.

FIG. 5 is a exemplary diagram illustrating mapping of the lines of a second original video format into the lines of a new format according to the present invention. FIG. 5 illustrates a conversion from a 1080P@60 Hz video format to a 1080I/4@120 Hz video format according to the present invention. A first original video frame 435 contains 1080 lines and a second original video frame 440 contains 1080 lines. New video frame 445 includes a first field 450 containing a first quarter of the 1080 lines of first original video frame 435, a second field 455 containing a different quarter of the 1080 lines of first original video frame 435, a third field 460 including a first quarter of the 1080 lines of second original video frame 440 and a fourth field 465 containing a different quarter of the 1080 lines of second original video field 440. The line numbers in first original video frame 435 correspond to the same line numbers mapped into first and second fields 450 and 455 of new video frame 445. The line numbers in second original video frame 440 correspond to the same line numbers mapped into fields 460 and 465 of new video frame 445. The mapping of lines into fields 450, 455, 460 and 465 of new video frame 465 represents only one permutation of groups of line sets of a possible 24. For example, mapping the current line set of field 450 (1,5,9,11 . . . 1077) into field 455 and the mapping current line set of field 455 (3,7,11,15 . . . 1079) into field 450 with fields 460 and 465 unchanged would be a second of the 24 possible permutations.

FIG. 6 is a exemplary diagram illustrating mapping of the lines of a third original video format into the lines of a new format according to the present invention. FIG. 6 illustrates a conversion from a 1080P@120 Hz video format to a 1080I/4@120 Hz video format according to the present invention. A first original video frame 475 contains 1080 lines, a second original video frame 480 contains 1080 lines, a third original video frame 485 contains 1080 lines and a fourth original video frame 490 contains 1080 lines. New video frame 495 includes a first field 500 containing a quarter of the 1080 lines of first original video frame 475, a second field 505 containing a quarter of the 1080 lines of second original video frame 480, a third field 510 including a quarter of the 1080 lines of third original video frame 485 and a fourth field 515 containing a quarter of the 1080 lines of fourth original video field 490. The line numbers in first original video frame 475 correspond to the same line numbers mapped into first fields 500 of new video frame 495. The line numbers in second original video frame 480 correspond to the same line numbers mapped into second field 505 of new video frame 495 The line numbers in third original video frame 485 correspond to the same line numbers mapped into third field 510 of new video frame 495. The line numbers in fourth original video frame 490 correspond to the same line numbers mapped into fourth fields 515 of new video frame 495. Note that the sets of line numbers mapped into each field of new frame 495 are different from one another and each set is one of the four possible sets of line numbers taking every fourth line number without repeating. The mapping of lines into fields 500, 505, 510 and 515 of new video frame 495 represents only one permutation of line sets a possible 24. For example, mapping the current lines of field 500 (1,5,9,13 . . . 1077) into field 505 and the mapping current lines of field 505 (3,7,11,15 . . . 1079) into field 500 leaving fields 510 and 515 unchanged would be a second of the 24 possible permutations.

Figure 7:
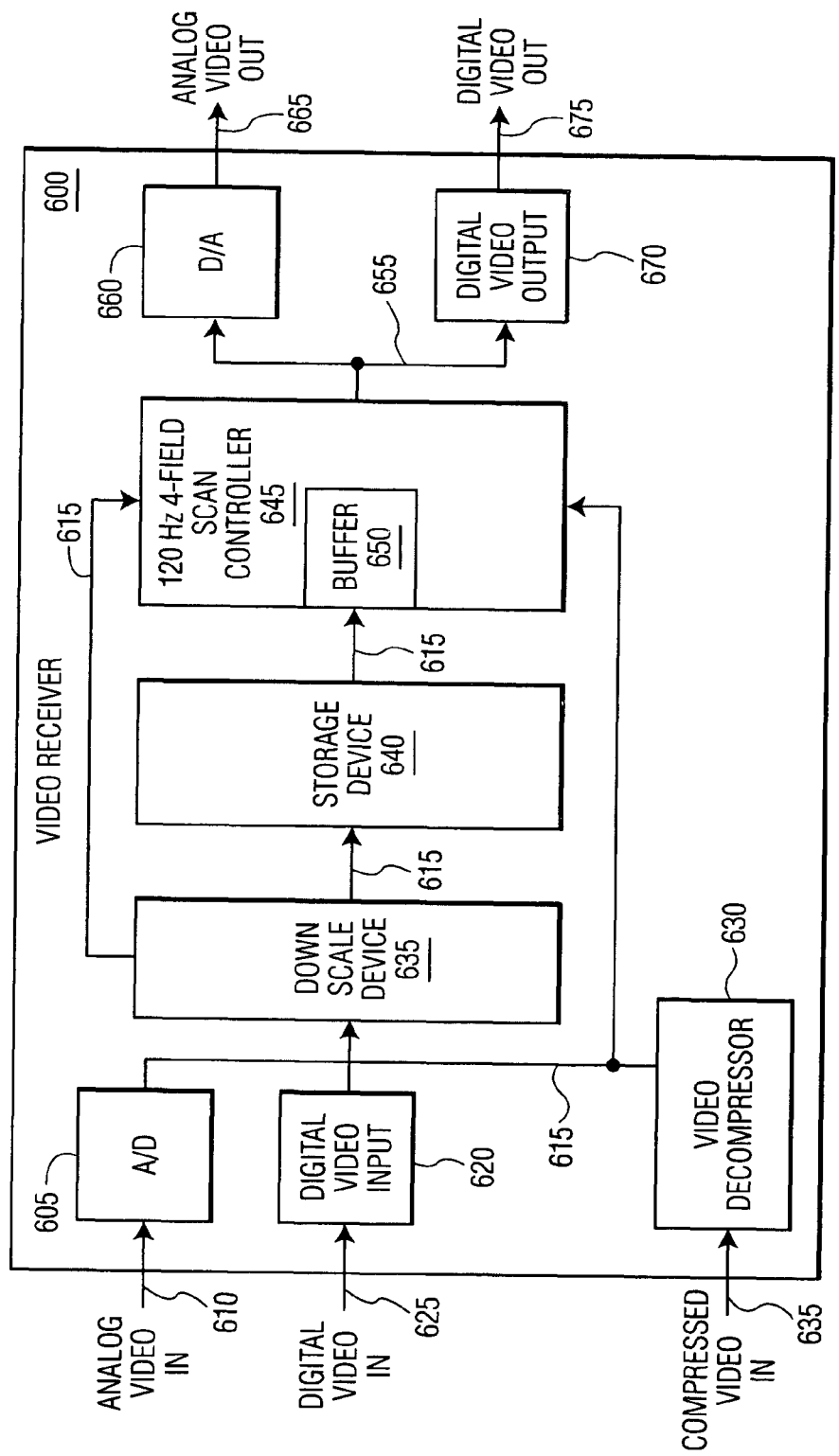
FIG. 7 is a schematic diagram of video receiver according to a first embodiment of the present invention.

FIG. 7 is a schematic diagram of video receiver according to a first embodiment of the present invention. In FIG. 7, a video receiver 600 includes an analog/digital (A/D) converter 605 for receiving an analog video signal 610 and converting the analog video signal to a digital video signal 615, a digital input 620 for receiving a digital video signal 625 and outputting digital video signal 615 and a video decompressor 630 for receiving a compressed digital video signal 635 and decompressing the compressed video signal to digital video signal 615.

Video receiver 600 also includes an optional downscale device 635 for reducing the number of lines in a video frame to a fixed value, a storage device 640 for storing the digital video data contained in digital video signal 615, and a 120 Hz 4-field scan controller 645. Scan controller 645 includes a buffer 650 for storing one or more frames of digital video data. Scan controller 645 may receive digital video data from A/D converter 605, digital video input 620, video decompressor 635, down scale device 635 or storage device 640. Scan controller 645 converts the video data received from an original format to a I/4@120 Hz format as illustrated in FIGS. 2 and 3 and described supra. Scan controller 645 outputs a digital video signal 655 in I/4@120 Hz video format.

Video receiver 600 further includes a digital to analog converter 660 for receiving digital video signal 655 from scan controller 645 and converting digital signal 655 to an analog signal 665 useable by an analog video display device, and a digital video output 670 also receiving digital video signal 655 and outputting a digital video signal 675 useable by a digital video display device.

Figure 8:
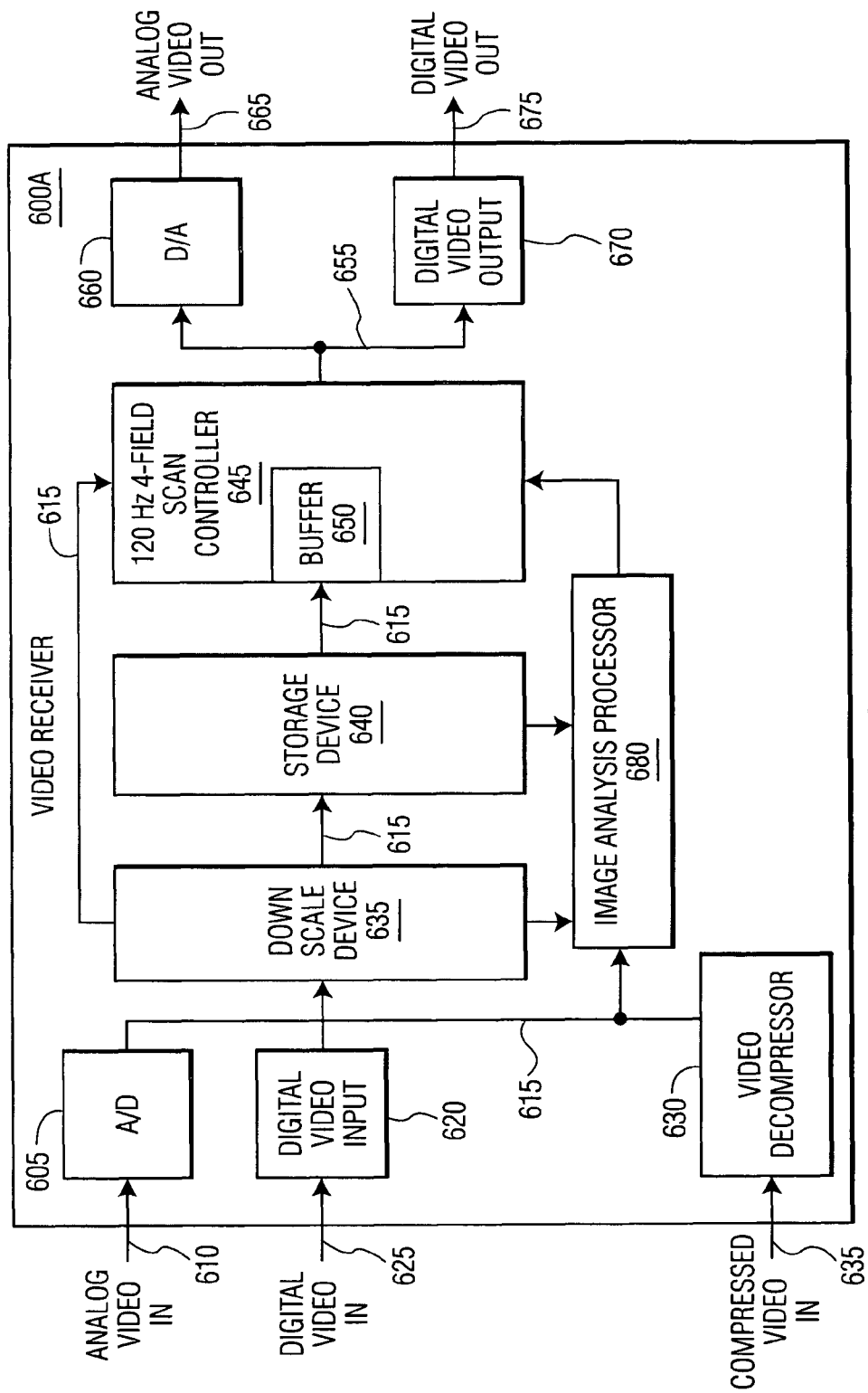
FIG. 8 is a schematic diagram of video receiver according to a second embodiment of the present invention.

FIG. 8 is a schematic diagram of video receiver according to a second embodiment of the present invention. In FIG. 8, a video receiver 600A is similar to video receiver 600 illustrated in FIG. 7 and described supra, except that video receiver 600A also includes an image analysis processor 680. Image analysis processor analyzes the stream of video frames and adaptively determines the permutations used by scan controller 645 as described supra in reference to FIGS. 2 and 3. Image processor 680 can receive digital data signals 615 from down scale device 635 as well as storage device 640. Another difference between receiver 600 of FIG. 7 and receiver 600A is the direct route of digital video signal 615 from A/ID converter 605, and of digital video input 620 and video decompressor 630, through image analysis processor 680.

The present invention is extendable to original video formats having frequencies higher than 120 Hz. For example, given a 1080P@240 Hz original format, the method of the invention would convert eight 1080P@240 Hz format frames to two 1080I/4@120 Hz frames that were displayed progressively (each of the two frames displayed interlaced however), in effect creating a hybrid interlaced/progressive video format. Every eight line of each 1080P@240 Hz frame would be used in the new hybrid format.

The present invention is adaptable to computer graphics display modes such as video graphics array (VGA), super video graphic array (SVGA) and extended video graphic array (XGA) formats by treating horizontal rows of pixels as lines in a frame. Thus VGA would be treated as having 200 or 480 lines per frame, XGA as having 480 or 768 lines per frame and SVGA as having 600 or 1200 lines per frame. VGA, XGA and SVGA are treated as progressive video formats. Note the number of "lines" in all cases is an even multiple of 4, so the invention is actually very well suited to computer graphic display modes.

Further, the present invention is usable by cathode ray tube (CRT) displays, other electron-beam based displays, and pixelated display devices such as liquid crystal displays (LCD), plasma displays and light emitting diode (LED) displays.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. For example, while even numbers of frames of original progressive video formats are mapped into the four field of the I/4@120 Hz format, it is possible to map odd number of frames using different algorithms then have been described supra. Therefore, it is intended that the following claims cover all such modifications and changes as fall within the true spirit and scope of the invention.

What is claimed is:

1. A method for converting, by a computer, video data in a first video format to video data in a second interlaced video format comprising:
- receiving said video data in the first video format;
- determining, from the received video data, a number of frames of the first video format to map into a frame of the second video format, the frame of the second video format having four fields;
- determining, selectively based on said received video data, a number of lines from each of the determined number of frames of the first video format to be mapped into each of the four fields of the frame of the second video format such that each of the four fields contains, according to the selection, either (i), according to a sub-selection, a predefined number lines, a number of lines equal to an integer multiple of the predefined number of lines, or a number of lines equal to a downscaled, even multiple of the predefined number of lines, or (ii) a number of lines equal to the number of lines in a frame of the first video format divided by four,
- selecting the determined number of lines from each of the number of frames of the first video format;
- providing a set of permutations of sequences, a permutation of said set mapping the number of selected lines into the fields of the frame of the second video format;
- selecting, by said computer and from among said set, said permutation, the number of permutations being based upon the number of fields in the frame of the second video format; and
- mapping the selected lines from each of the number frames of the first video format into the four fields of the frame of the second video format according to the determined sequence.

2. The method of claim 1, wherein the determining of the number of frames of the first video format to map into the frame of the second video format is based upon the number of fields of the second video format and the frame display frequencies of the first and second video formats.

3. The method of claim 1, wherein the determining of the number of lines from each of the number of frames of the first video format to be mapped into fields of the frame of the second video format is based upon the number of fields of the second video format and the frame display frequencies of the first and second video formats.

4. The method of claim 1, wherein the frame display frequency of the second video format is 120 Hz.

5. The method of claim 1, wherein the selected permutation dynamically changes from frame to frame of said second video format.

6. A method for converting video data in a first interlaced video format to video data in a second interlaced video format comprising:
- selecting a first set of lines comprising alternate lines from a first field of a frame of the first interlaced video format;
- selecting a second set of lines comprising alternate lines not selected for the first set of lines from the first field of the frame of the first interlaced video format;
- selecting a third set of lines comprising alternate lines from a second field of the frame of the first interlaced video format; and
- selecting a fourth set of lines comprising alternate lines not selected for the third set of lines from the second field of the frame of the first interlaced video format,
- wherein said selecting of the first through fourth set of lines is performed adaptively based on said video data in said first interlaced video format and maps each set of lines into a different field of four fields of the second interlaced video format.

7. The method of claim 6, further including selecting the one permutation of the set of permutations based upon image characteristics of the frame of the first video format.

8. The method of claim 6, further including downscaling the number of lines in the frame of the first interlaced video format to a new number of lines that is the highest even multiple of the number of lines in a frame of the second interlaced video format that is less than or equal to the number of lines in the frame of the first interlaced video format.

9. The method of claim 6, wherein the frequency of the second interlaced video format is 120 Hz.

10. The method of claim 6, wherein the mapping is such that each of the four fields optionally contains either (i) a predefined number lines, a number of lines equal to an integer multiple of the predefined number of lines, or a number of lines equal to a downscaled, even multiple of the predefined number of lines, or (ii) a number of lines equal to the number of lines in a frame of the first video format divided by four; and
- wherein which set of lines to map into which field of the frame of the second interlaced video format is determined such that a sequence for mapping the set of lines selects from one of a set of permutations, the number of permutations in said set of permutations being based upon the number of such set of lines.

11. The method of claim 6, wherein, from the standpoint of said frame of the first interlaced video format, the four sets of lines spatially interleave pair-wise for each pair of the four sets.

12. A method for converting video data in a progressive first video format to video data in an interlaced second video format comprising:
- calculating a number of frames of the first video format to be mapped into a frame of the new video format based on the following formula: the number of frames is equal to the number of fields in the second video format times the display frequency of the first video format divided by the display frequency of the second video format;
- wherein a number of lines from each of the calculated number of frames of the first video format to be mapped into fields of the frame of the second video format is optionally either (i) a predefined number of lines, a number of lines equal to an integer multiple of the predefined number of lines, or a number of lines equal to a downscaled, even multiple of the predefined number of lines, or (ii) the number of lines in the frames of the first video format divided by the number of frames of the first video format to be mapped into the frame of the new video format;
- selecting a first set of lines comprising alternate fourth lines from one of the number of frames of the first video format;
- selecting a second set of lines comprising alternate fourth lines not selected for the first set of lines from one of the number of frames of the first video format;
- selecting a third set of lines comprising alternate fourth lines not selected for the first or second set of lines from one of the number of frames of the first video format; and
- selecting a fourth set of lines comprising alternate fourth lines not selected for the for the first, second or third set of lines from one of the number of frames of the first video format;
- said selecting of the first through fourth sets of lines being based on determining which set of lines to map into which field of the frame of the second video format according to one of a set of permutations of said lines, said one permutation mapping each set of lines into a different field of four fields of the second video format, wherein, from the standpoint of a frame of the first video format, each of the first through fourth set of lines spatially interleaves with each other of the first through fourth set of lines.

13. The method of claim 12, further including downscaling the number of lines in each frame of the first video format to a number that is the highest even multiple of the number of lines in each frame of the second video format that is less than or equal to the number of lines in each frame of the first video format.

14. The method of claim 12, wherein the frequency of the second video format is 120 Hz.

15. The method of claim 12, further comprising varying the selected one permutation from frame to frame of said second video format.

16. A method for converting video data in a progressive first video format to video data in an interlaced second video format comprising:

wherein a number of frames of the first video format to be mapped into a frame of the new video format is equal to the number of fields in the second video format times the display frequency of the first video format divided by the display frequency of the second video format;

wherein a number of lines from each of the number of frames of the first video format to be mapped into fields of the frame of the second video format is optionally either (i) a predefined number of lines, a number of lines equal to an integer multiple of the predefined number of lines, or a number of lines equal to a downscaled, even multiple of the predefined number of lines, or (ii) the number of lines in the frames of the first video format divided by the number of frames of the first video format to be mapped into the frame of the new video format;

selecting a first set of lines comprising alternate fourth lines from one of the number of frames of the first video format;

selecting a second set of lines comprising alternate fourth lines not selected for the first set of lines from one of the number of frames of the first video format;

selecting a third set of lines comprising alternate fourth lines not selected for the first or second set of lines from one of the number of frames of the first video format;

selecting a fourth set of lines comprising alternate fourth lines not selected for the first, second or third set of lines from one of the number of frames of the first video format;

mapping each set of lines into a different field of four fields of the second video format; and determining which set of lines to map into which field of the frame of the second video format based upon one permutation of the set of permutations of the number of sets of line, further including selecting the one permutation of the set of permutations based upon image characteristics of the number of frames of the first video format.

17. An apparatus for converting video signal data in a first video format to video signal data in a second video format comprising:

one or more video inputs, each video input configured for receiving video signals of different video types, the video signals in the first video format that can be either a progressive scan format or an interlaced format, and each video input configured for outputting a digital video signal;

a storage device configured for receiving and storing the digital video signals;

a scan controller configured for reading a stored digital signal of the stored video signals or receive the digital signal from the one or more inputs and configured for converting the format of the digital signal from the first video format to the second video format, the second video format comprising four interlaced fields and having a field display frequency of 120 Hz;

an image analysis processor configured for selecting sets of lines from frames of the digital video signal in the first video format for mapping into the fields of frames of the second video format adaptively based upon the video content of the frames of the digital video signal in the first video format; and one or more video outputs, each video output configured for receiving the digital video signal in the second video format and configured for outputting the video signal in the second video format.

18. The apparatus of claim 17, further including a downscale device adapted to downscale the number of lines in a frame of the first video format to a new number of lines that is the highest even multiple of the number of lines in a frame of the second video format that is less than or equal to the number of lines in the frame of the first video format.

19. The apparatus of claim 17, wherein said scan controller further includes a buffer for buffering one or more frames of the digital video signal in the first video format as the frames are read out of the storage device.

20. The apparatus of claim 17, wherein the video types are selected from the group consisting of analog video signals, digital video signals and compressed video signals.

21. The apparatus of claim 17, said scan controller being configured for:

receiving said video signal data in the first video format;

determining, from the received data, a number of frames of the first video format to map into a frame of the second video format, the frame of the second video format having four interlaced fields; and determining, selectively based on said received data, a number of lines from each of the determined number of frames of the first video format to be mapped into each of the four fields of the frame of the second video format such that each of the four fields contains, according to the selection, either (i), according to a sub-selection, a predefined number lines, a number of lines equal to an integer multiple of the predefined number of lines, or a number of lines equal to a downscaled, even multiple of the predefined number of lines, or (ii) a number of lines equal to the number of lines in a frame of the first video format divided by four.

* * * * *